United States Patent
Brunn et al.

(10) Patent No.: US 11,586,818 B2
(45) Date of Patent: Feb. 21, 2023

(54) IN-CONTEXT COGNITIVE INFORMATION ASSISTANT

(71) Applicant: International Business Machines Corporation, Armonk, NY (US)

(72) Inventors: Jonathan F. Brunn, Logan, UT (US); Patrick M. Commarford, Louisville, KY (US); Stephen J. Foley, Quincy, MA (US); John Girata, Jr., Raleigh, NC (US); Kelley M. Gordon, Apex, NC (US); Sarah B. Lips, Raleigh, NC (US); Gayle C. Thiel, Littleton, MA (US)

(73) Assignee: International Business Machines Corporation, Armonk, NY (US)

( * ) Notice: Subject to any disclaimer, the term of this patent is extended or adjusted under 35 U.S.C. 154(b) by 242 days.

(21) Appl. No.: 16/115,407

(22) Filed: Aug. 28, 2018

(65) Prior Publication Data
US 2020/0073934 A1    Mar. 5, 2020

(51) Int. Cl.
*G06F 40/279* (2020.01)
*G06F 16/31* (2019.01)
*G06F 16/34* (2019.01)
*G06F 16/38* (2019.01)

(52) U.S. Cl.
CPC ............ *G06F 40/279* (2020.01); *G06F 16/31* (2019.01); *G06F 16/34* (2019.01); *G06F 16/38* (2019.01)

(58) Field of Classification Search
None
See application file for complete search history.

(56) References Cited

U.S. PATENT DOCUMENTS

| | | |
|---|---|---|
| 9,734,208 B1 | 8/2017 | Goldstein et al. |
| 2009/0228918 A1 | 9/2009 | Rolff et al. |
| 2011/0184960 A1 | 7/2011 | Delpha et al. |
| 2013/0254296 A1* | 9/2013 | Lai .......... H04L 65/40 709/205 |
| 2014/0046706 A1 | 2/2014 | Goldstein et al. |
| 2014/0379799 A1* | 12/2014 | LeCroy ......... H04L 65/403 709/204 |
| 2015/0045068 A1* | 2/2015 | Soffer ........... G01C 21/20 455/456.3 |
| 2015/0046370 A1* | 2/2015 | Libin ............ G06Q 10/10 705/345 |

(Continued)

FOREIGN PATENT DOCUMENTS

WO    2017003491    1/2017

OTHER PUBLICATIONS

"Introducing Delve (codename Oslo) and the Office Graph", https://www.microsoft.com/en-us/microsoft-365/blog/2014/03/11/introducing-codename-oslo-and-the-office-graph/, by the Office 365 team, on Mar. 11, 2014.

*Primary Examiner* — Dawaune A Conyers
(74) *Attorney, Agent, or Firm* — L. Jeffrey Kelly

(57) ABSTRACT

An in-context cognitive information assistant is provided by: obtaining a context for a user, wherein the context comprises a calendar activity with one or more other users; supplementing the context by obtaining one or more conversations with the user related to the context; extracting cognitive data for the context and the conversations; and finding relevant materials in a corpus using the cognitive data. The relevant materials are used to prepare the user for interactions with other users.

20 Claims, 5 Drawing Sheets

(56) References Cited

U.S. PATENT DOCUMENTS

| | | | |
|---|---|---|---|
| 2016/0092578 A1* | 3/2016 | Ganani | G06F 16/9535 |
| | | | 707/728 |
| 2016/0132568 A1 | 5/2016 | Vogel et al. | |
| 2017/0126755 A1 | 5/2017 | Singh et al. | |
| 2017/0293851 A1* | 10/2017 | Chawla | G06Q 10/08 |
| 2018/0045068 A1* | 2/2018 | Brinson | F01D 13/006 |
| 2018/0176269 A1* | 6/2018 | Griffin | H04L 65/403 |
| 2019/0108493 A1* | 4/2019 | Nelson | G06F 40/186 |

* cited by examiner

IN-CONTEXT COGNITIVE INFORMATION ASSISTANT

BACKGROUND

The present invention relates generally to an in-context cognitive information assistant for use in collaboration systems.

In Enterprise File Sync and Share (EFSS) solutions, such as IBM® Connections™, Box™, Dropbox™, Google® Drive™, and Microsoft® One Drive™, users have the ability to store and share their files in an online repository. The experience associated with these solutions all map very closely to the file systems of the user's computer (such as Windows Explorer™ and Mac Finder™), and allow synchronization between the user's computer and the repository, with the additional benefit that folders and individual files can be shared with others.

These solutions generally provide folders as the primary means of organizing files. Likewise, the folders serve as the primary means of finding files. These systems also offer search and browser interfaces for finding content.

However, the search and browser interfaces generally place the burden on the user to find content. As a result, the user may struggle to find content. Duplication of similar content abounds due to difficulty in discovery, and users spend much time browsing hierarchies and search results. Commonly known techniques used with these interfaces include keyword search, faceted browse, recency search, favoriting and/or pinning, foldering and/or tagging, sorting, etc.

There are a number of drawbacks for these commonly known techniques, such as requiring some form of active effort from the user to find the most relevant content. For keyword searches, the user must remember characteristics of the file's name or content, and enter a string, and the search assumes the user knows something about what they are looking for. Recency searches rely on historical information about the user's actions, but are not predictive of future interests. Folders, tagging, favorites, and pinning require active manual involvement from the user, in advance, to ensure they can find the file later. Faceted browse requires active user participation and can be laborious.

Thus, there is a need in the art for improved methods and systems of storing and searching for content. The present invention satisfies this need.

SUMMARY

The invention provided herein has many embodiments useful, for example, in implementing a system, method and computer program product for providing an in-context cognitive information assistant. The in-context cognitive information assistant is provided by: obtaining a context for a user; supplementing the context by obtaining conversations with the user related to the context; extracting cognitive data for the context and the conversations; and finding relevant materials in a corpus using the cognitive data. The relevant materials are used to prepare the user for interactions with other users.

In one embodiment, the context comprises a calendar activity with one or more other users, wherein the calendar activity is used to find the other users, the conversations between the user and the other users, and the relevant materials from the user and the other users.

The cognitive data is extracted by sending text of the context and the conversations to a cognitive service, in order to obtain the cognitive data comprising one or more entities, topics and concepts related to the context and the conversations, wherein the entities, topics and concepts are used to find the relevant materials. The entities, topics and concepts prioritize finding the relevant materials that are most relevant to the context and the conversations.

A primer step is performed to index the cognitive data in the corpus, wherein content is sent to the cognitive service to extract the cognitive data; and the cognitive data is stored in the corpus with reference to the content. The cognitive data is prioritized based on a source for the content, the content's author, and the author's relationship with users. Access to the relevant materials may be controlled.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and in which is shown by way of illustration one or more specific embodiments in which the invention may be practiced. It is to be understood that other embodiments may be utilized, and structural and functional changes may be made without departing from the scope of the present invention.

Overview

The present invention provides for an in-context cognitive information assistant for use with a collaboration platform. The invention processes social metadata and conversations from the collaboration platform using cognitive services to identify content that is relevant to a user. Specifically, the invention uses calendar entries and associated conversations to identify relevant content for the user.

In one embodiment, IBM® Connections™ is used as the collaboration platform that integrates email, calendar, activity and task management, instant messaging, file sharing, collaborative document editing, and more, into a unified solution. Teams can access these capabilities from a personalized workspace to communicate, manage work, and share tools and resources. However, other collaboration platform may be used as well.

In one embodiment, IBM® Watson™ Cognitive Services are used as the cognitive services, although other cognitive services may be used as well. The IBM® Watson™ Cognitive Services perform a number of different functions as described below.

Language extraction and understanding may be performed using the IBM® Watson™ Natural Language Understanding, which analyzes text to extract meta-data from content such as entities, topics, concepts, etc. The IBM® Watson™ Natural Language Understanding also returns both overall sentiment and emotion for a document, and targeted sentiment and emotion towards keywords in the text for deeper analysis. In addition, the IBM® Watson™ Natural Language Understanding understands text in multiple languages.

Speech-to-text may be performed using the IBM® Watson™ Speech to Text that converts audio and voice into written text.

Image classification may be performed using the IBM® Watson™ Visual Recognition that understands the content of images. It can analyze images for scenes, objects, faces, colors, food, text, explicit content and other subjects that can provide insights into visual content.

Cloud Computing Environment

Figure 1:
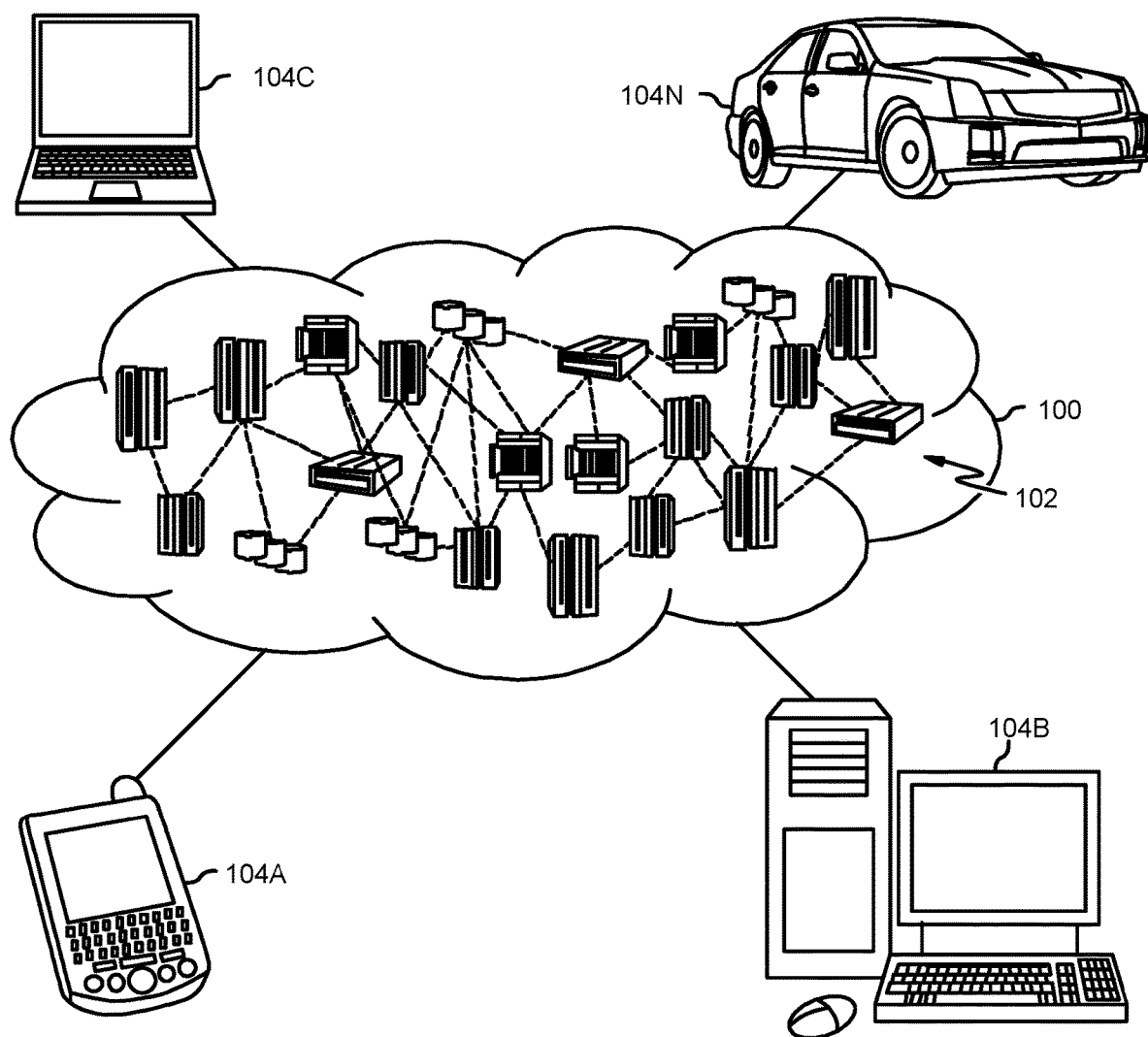
FIG. 1 is a pictorial representation of an illustrative cloud computing environment used for implementing an in-context cognitive information assistant, according to one embodiment.

FIG. 1 is a pictorial representation of an illustrative cloud computing environment 100 used for implementing the in-context cognitive information assistant, according to one embodiment.

As shown, a cloud computing environment 100 includes one or more cloud computing nodes 102 with which local computing devices used by cloud consumers, such as, for example, personal digital assistant (PDA) or cellular telephone 104A, desktop computer 104B, laptop computer 104C, and/or automobile computer system 104N may communicate. Nodes 102 may communicate with one another. They may be grouped (not shown) physically or virtually, in one or more networks, such as Private, Community, Public, or Hybrid clouds, or a combination thereof. This allows cloud computing environment 100 to offer infrastructure, platforms and/or software as services for which a cloud consumer does not need to maintain resources on a local computing device. It is understood that the types of computing devices 104A-N shown in FIG. 1 are intended to be illustrative only and that computing nodes 102 and cloud computing environment 100 can communicate with any type of computerized device over any type of network and/or network addressable connection (e.g., using a web browser).

The computing nodes 102 and/or computing devices 104A-N perform various functions and steps as described in more detail below.

In-Context Cognitive Information Assistant

Figure 2:
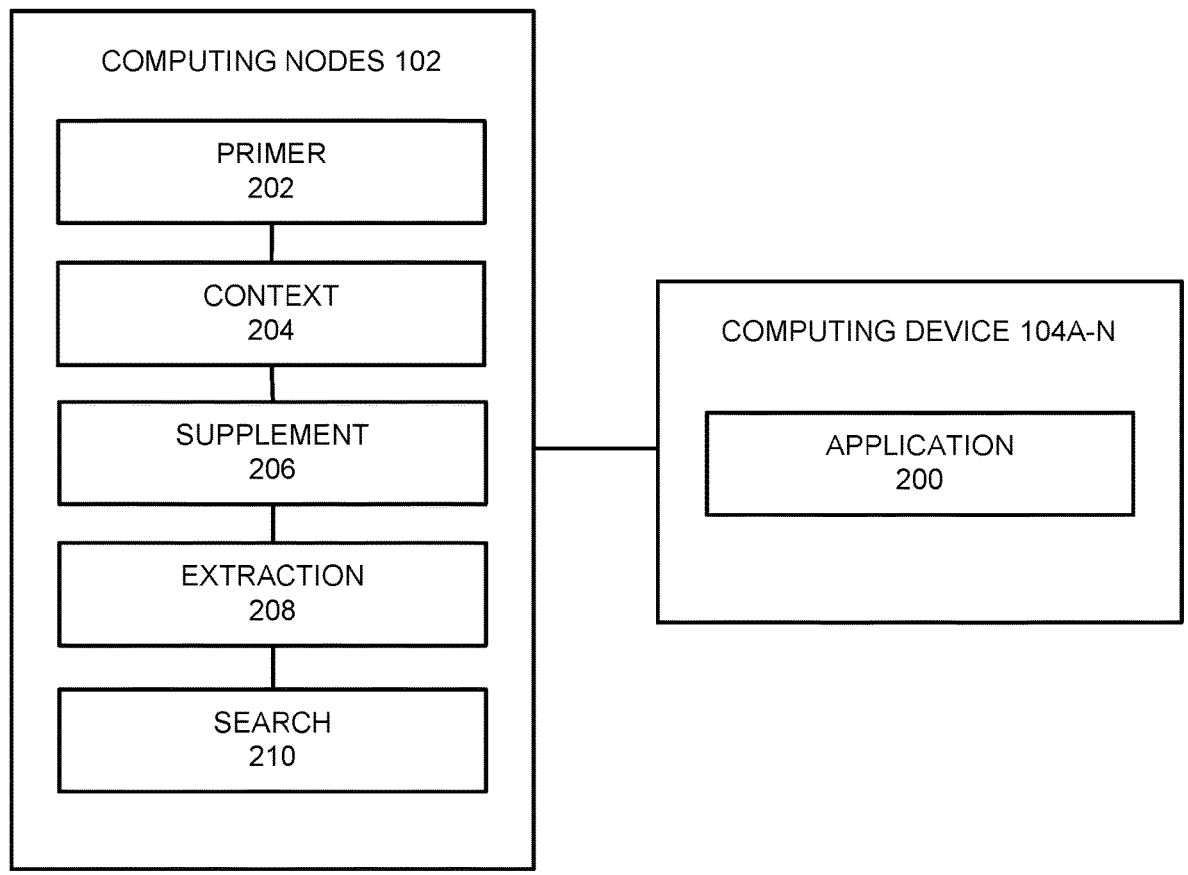
FIG. 2 is a block diagram illustrating how the in-context cognitive information assistant is implemented, according to one embodiment.

FIG. 2 is a block diagram illustrating how the in-context cognitive information assistant is implemented, according to one embodiment. In this embodiment, the in-context cognitive information assistant is implemented by:

an application 200 on the computing device 104A-N, wherein the application 200 allows the user to invoke the in-context cognitive information assistant and display results therefrom; and the computing nodes 102 perform a plurality of functions or steps 202-210 of the in-context cognitive information assistant and then present the results to the application 200 on the computing device 104A-N.

These functions and steps are described in more detail below.

In a Primer function or step 202, the computing nodes 102 perform the function or step of indexing cognitive data in a corpus, wherein content is sent to one or more cognitive services to extract the cognitive data and the cognitive data is stored in the corpus with reference to the content. This further comprises prioritizing the cognitive data based on a source for the content, the author, and the author's relationship with users. In addition, access to the relevant materials is controlled.

In a Context function or step 204, the computing nodes 102 perform the function or step of obtaining a context for a user, wherein the context comprises a calendar activity with one or more other users. The calendar activity is used to find the other users, the conversations between the user and the other users, and the relevant materials from the user and the other users.

In a Supplement function or step 206, the computing nodes 102 perform the function or step of supplementing the context by obtaining one or more conversations with the user and the other users related to the context.

In an Extraction function or step 208, the computing nodes 102 perform the function or step of extracting cognitive data for the context and the conversations. The extracting of the cognitive data comprises sending text of the context and the conversations to the cognitive services in order to obtain the cognitive data comprising one or more entities, topics and concepts related to the context and the conversations.

In a Search function or step 210, the computing nodes 102 perform the function or step of finding relevant materials in a corpus using the cognitive data, wherein the entities, topics and concepts are used to find the relevant materials, and the relevant materials are used to prepare the user for interactions with other users. The entities, topics and concepts prioritize finding the relevant materials that are most relevant to the context and the conversations.

These functions or steps 202-210 may be repeated as necessary, and any one or more of the functions or steps 202-210 may be omitted as required.

Use Scenarios

There are two primary scenarios for the use of this invention:

Scenario 1—finding content for a particular conversation or meeting.

Scenario 2—finding content for the user's hourly, daily, weekly, monthly, recurring, etc., activities.

In the first scenario, the invention searches the user's conversations and meetings to find content. The invention uses the cognitive services to extract information from the user's conversations and participants of the user's meeting invites. Extracted information is used to search for content with matching characteristics, where those characteristics are defined by the output of the cognitive services. These characteristics include referenced entities, topics and concepts.

In the second scenario, the invention searches the user's calendar to find co-attendees at meetings, but the invention does not directly prioritize the display of information from those co-attendees. Instead, the invention uses the cognitive services to extract information from the user's correspondence with the attendees (as a primary factor) and from other available information posted by the co-attendees (as secondary factors). Extracted information is used to search for content with matching characteristics, where those characteristics are defined by the output of the cognitive services. These characteristics include referenced entities, topics and concepts.

In other words, the invention attempts to predict, through recent conversations and correspondence with meeting attendees, likely entities, topics and concepts, or other points of discussion, and then uses the cognitive services to retrieve information that can help the user prepare for their meetings and future conversations.

Specifically, one important aspect of the invention is the use of calendar data to: (a) find individuals who are meeting with a user, (b) find correspondence and materials for those individuals, (c) use the correspondence and materials to find entities, topics and concepts, and (d) using the entities, topics and concepts to perform cognitive discovery, search, and retrieval of new and related material for the user.

A number of benefits result from the invention. The invention prioritizes discovery of information most relevant for the user's future activities. The invention helps the user discover information most relevant to shared topics of communication with meeting participants, even when that information cannot be directly detected in calendar data, such as meeting invites. The invention also surfaces information in the context of sharing activities, bringing the files most likely to be relevant to the user in a specified time period, e.g., today, to the top of the page being displayed.

A number of efficiencies are provided by this invention. For example, the user previously had to perform numerous steps to share a file, such as: (1) clicking a button to add files, (2) selecting a displayed box, (3) navigating to a folder in the box, (4) navigating the folder's tree, (5) selecting a displayed file, (6) clicking a button to share the selected file, (7) clicking a button to add connections, (8) selecting a button to display connections, (9) navigating into a folder for the connections, (10) navigating the folder's tree, (11) selecting a file, and (12) then clicking a button to share the selected file.

In contrast, this invention would only require the steps of (1) clicking a button to add files, (5) selecting a file, and (6) clicking a button to share the selected file. Moreover, once the file is shared, its content is available for use in the two scenarios identified above.

In Scenario 1, the following steps are performed when finding content for a particular conversation or meeting.
1. The text of the conversation is processed by the cognitive services for language extraction and understanding to obtain the cognitive data for the conversation.
2. When the conversation is a meeting invite, the invention further supplements the catalog of information associated with the meeting invite with the cognitive data extracted from conversations between the user and meeting participants.
3. The cognitive data is used as input to search for content.

Figure 3A:
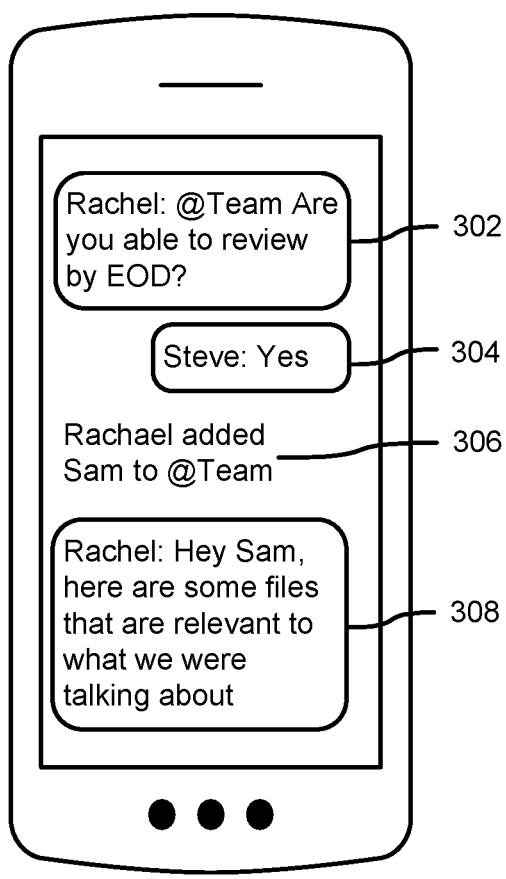
FIG. 3A shows an example of a user interface of a smartphone for a conversation.

For example, FIG. 3A shows the user interface of a smartphone 300 for the conversation. A text message 302 comprised of "Are you able to review by end-of day" from Rachael is addressed to @Team, which results in the text message being sent to all of the participants of the conversation.

Steve responds with a text message 302 comprised of "Yes".

Rachael then adds Sam to the conversation, as shown by 306.

A text message 308 comprised of "Sam, here are some files that relevant to this conversation" is send from Rachael to Sam.

Figure 3B:
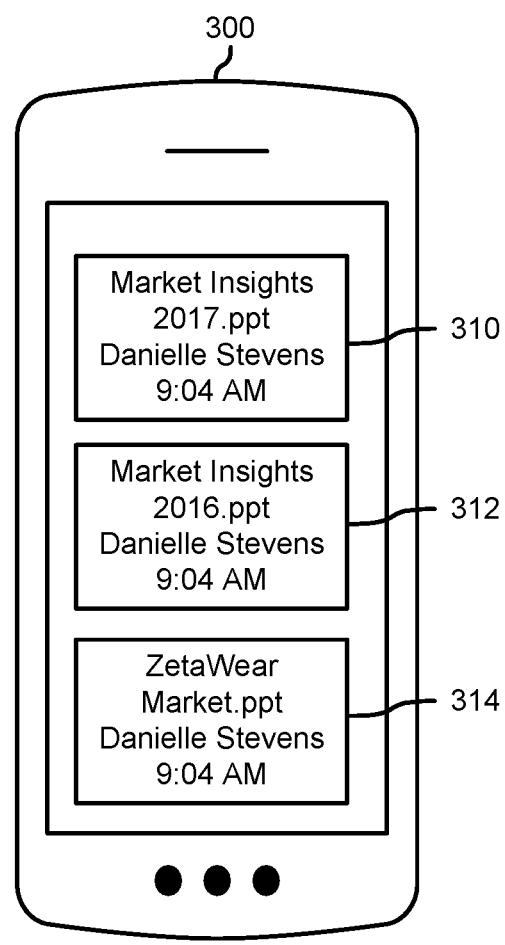
FIG. 3B shows the user interface of the smartphone displaying content suggested by the in-context cognitive information assistant.

FIG. 3B shows the user interface of the smartphone 300 displaying the suggested files 310, 312, 314. Despite being located in different folders in different file repositories, the invention has defined these suggested files 310, 312, 314 as the most likely to be selected files by matching the cognitive data associated with the files to the user's current context, the conversation and the user's calendar.

In Scenario 2, the following steps are performed when finding content for the user's daily activities:
1. The text of the user's meetings, along with recent conversations with the participants of the meetings, is processed by the cognitive services for language extraction and understanding to obtain the cognitive data related to the user's day. Since the invention uses the conversations from the user with co-attendees at meetings, the invention prioritizes topics the user has been discussing with people they will meet with today.
2. The cognitive data is used as input to search for content.

Figure 4:
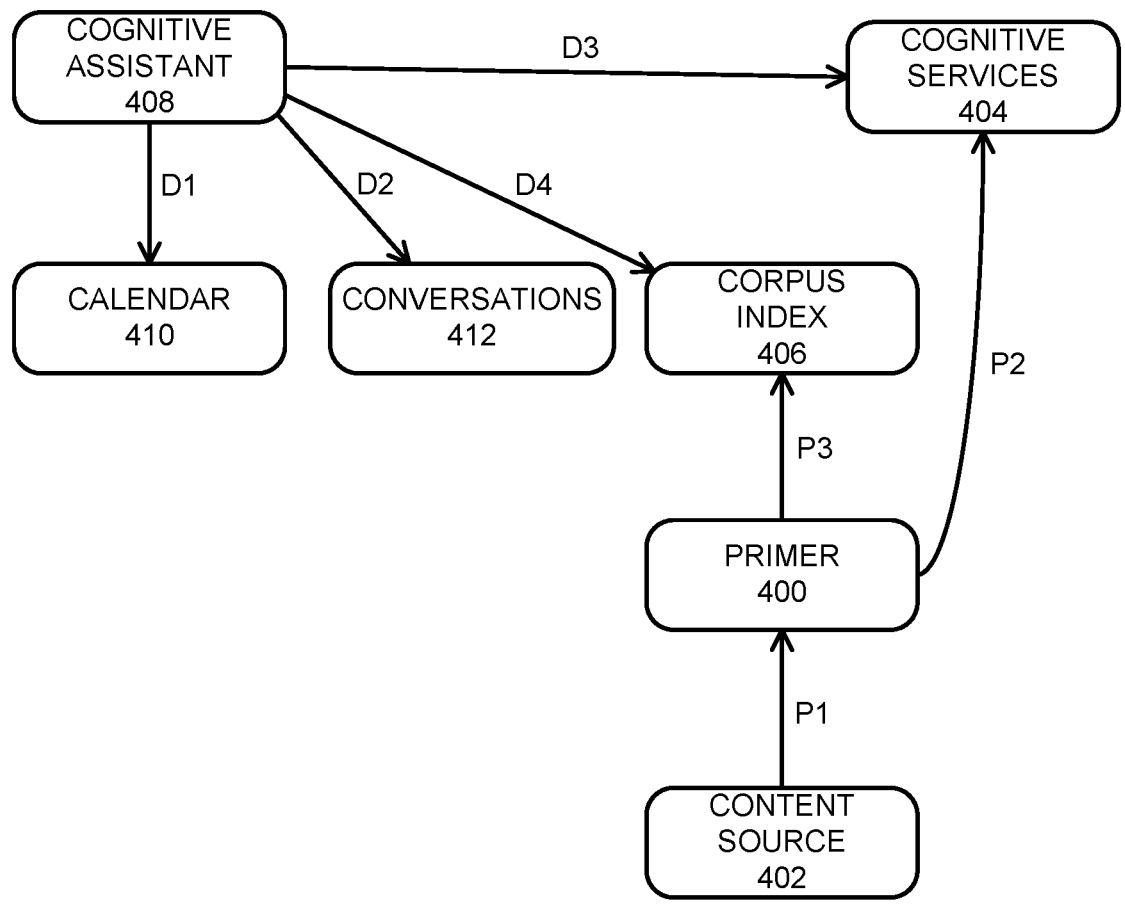
FIG. 4 illustrates common runtime processing performed for the in-context cognitive information assistant, according to one embodiment.

FIG. 4 illustrates common runtime processing performed for both scenarios.

For example, the common runtime processing includes a Primer 400, which indexes cognitive data from content, as set forth below:

In step P1, as content from a Content Source 402 is ingested by the Primer 400, events are received representing changes to the content. For example, an event is a description of content that has changed and what caused the content to change.

In step P2, new and updated content is sent to the Cognitive Services 404 to obtain the cognitive data related to the content, for example, by language extraction and understanding. Voice and audio content is first converted from speech to text, and then that text is sent to the Cognitive Services 404 for language extraction and understanding. In addition, image content is sent to the Cognitive Services 404 for image classification.

In one embodiment, the language extraction and understanding is performed using the Cognitive Service 404 that performs natural language understanding, which analyzes text to extract meta-data from content such as entities, topics and concepts. This Cognitive Service 404 also returns both overall sentiment and emotion for a document, and targeted sentiment and emotion towards keywords in the text for deeper analysis. In addition, this Cognitive Service 404 understands text in multiple languages.

In one embodiment, the speech to text is performed using the Cognitive Service 404 that converts audio and voice into written text.

In one embodiment, the image classification is performed using the Cognitive Service 404 that performs visual recognition for understanding the content of images. This Cognitive Service 404 can analyze images for scenes, objects, faces, colors, food, text, explicit content and other subjects that can provide insights into visual content.

In step P3, the cognitive data extracted in step P2 is stored in a Corpus Index 406 or other database, for example, a SOLR™ or NOSQL™ database, with reference to the content.

Access is controlled by marking content and cognitive data as private, organizationally public, public, etc., in the Corpus Index 406, wherein the private or organizationally public content is access controlled using a list of users, groups and/or communities and their respective access privileges.

The common runtime processing includes a Cognitive Assistant 408, which performs a discovery process using cognitive data from a current context to find related content, as described below:

In step D1, the current context is retrieved, for example, from the user's Calendar 410 for a period of time. In one example, a user Jon has several meetings scheduled during the period of time with other users Patrick, Steve and Kelley.

In step D2, the current context is supplemented with Conversations 412, which may comprise email, chats, texts, instant messages, etc. In one example, the user Jon has received an email from Kelley and participated in a team chat with Patrick and Steve.

In step D3, the current context and text from the Conversations 412 are sent to a Cognitive Service 404 that performs natural language understanding for language extraction and understanding to obtain the cognitive data related to the current context and Conversations 412.

In step D4, the Corpus Index 406 created in step P3 is then searched using the cognitive data to find relevant materials related to the current context, respecting the access control and access privileges in the Corpus Index 406.

The invention may prioritize among the cognitive data to use in matching, or assign weighting values based on the Content Source 402, the author, and the author's relationship with the user. For example, in Scenario 2, the invention may assign weighting values to the cognitive data found in Conversations 412 with a meeting chair, or someone in the user's network, or based on the user's reporting hierarchy.

Extra emphasis can be given to new cognitive data found in emails and other Conversations 412 which share some cognitive data with the meetings on the user's Calendar 410.

The invention uses both confidence values and frequency values of each entity, topic, concept, etc., from among multiple Conversations 412 in the input for the scenario. For example, in Scenario 2, when curating content relevant to a person's upcoming day, if an entity is referenced with a 90% confidence value in five Conversations 412 with a user, this may be a more important topic than an entity referenced with a 95% confidence value in only one Conversation 412.

The interface offers views to filter on: content that has been previously viewed or not viewed to help the user find content they know about, or find new materials to brief them and learn new information they need for their meetings.

Statutory Subject Matter

It can be seen that the present invention provides a number of benefits and advantages. These benefits and advantages include improvements to the technology or technical field of managing content related to calendars and conversations, and more specifically, providing for an in-context cognitive information assistant. These benefits and advantages also include improvements to the functioning of the devices themselves, including the cloud computing environment 100 generally and the computing nodes 102 specifically, as well as the computing devices 104A-N, as compared to prior computer-implemented methods and systems of managing content related to calendars and conversations.

Both generally and specifically, these steps and functions of the computer-implemented method and system comprise specific improvements other than what is well-understood, routine and conventional in the field. Moreover, these steps and functions of the computer-implemented method and system add unconventional steps to a particular useful application.

Cloud Computing

It is to be understood that this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring again to FIG. 1, illustrative cloud computing environment 100 is depicted. As shown, cloud computing environment 100 includes one or more cloud computing nodes 102 with which local computing devices used by cloud consumers, such as, for example, personal digital assistant (PDA) or cellular telephone 104A, desktop computer 104B, laptop computer 104C, and/or automobile computer system 104N may communicate. Nodes 102 may communicate with one another. They may be grouped (not shown) physically or virtually, in one or more networks, such as Private, Community, Public, or Hybrid clouds as described hereinabove, or a combination thereof. This allows cloud computing environment 100 to offer infrastructure, platforms and/or software as services for which a cloud consumer does not need to maintain resources on a local computing device. It is understood that the types of computing devices 104A-N shown in FIG. 1 are intended to be illustrative only and that computing nodes 102 and cloud computing environment 100 can communicate with any type of computerized device over any type of network and/or network addressable connection (e.g., using a web browser).

Figure 5:
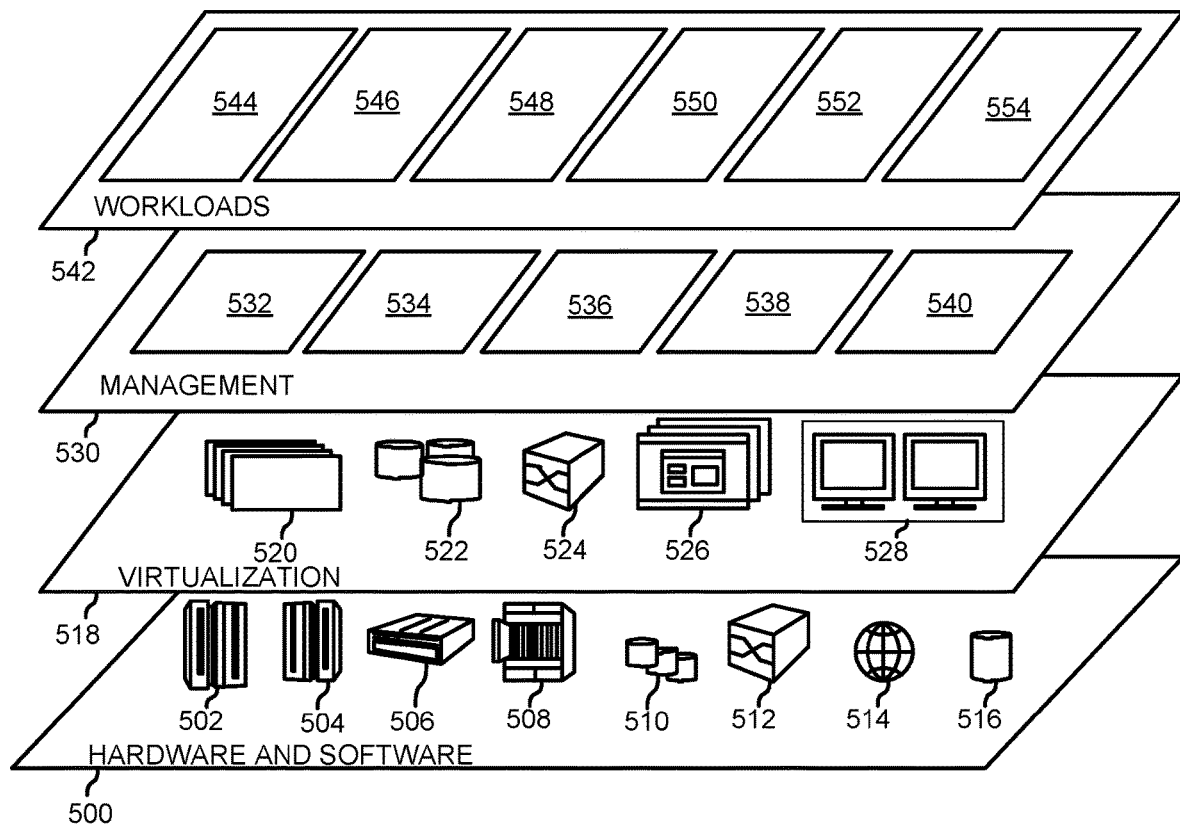
FIG. 5 illustrates a set of functional abstraction layers provided by the cloud computing environment.

Referring now to FIG. 5, a set of functional abstraction layers provided by cloud computing environment 100 (FIG. 1) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 500 includes hardware and software components. Examples of hardware components include: one or more computers such as mainframes 502; RISC (Reduced Instruction Set Computer) architecture based servers 504; servers 506; and blade servers 508; storage devices 510; and networks and networking components 512. In some embodiments, software components include network application server software 514 and database software 516.

Virtualization layer 518 provides an abstraction layer from which the following examples of virtual entities may be provided: virtual servers 520; virtual storage 522; virtual networks 524, including virtual private networks; virtual applications and operating systems 526; and virtual clients 528.

In one example, management layer 530 may provide the functions described above. Resource provisioning 532 provides dynamic procurement of computing resources and other resources that are utilized to perform tasks within the cloud computing environment 100. Metering and pricing 534 provide cost tracking as resources are utilized within the cloud computing environment 100, and billing or invoicing for consumption of these resources. In one example, these resources may include application software licenses. Security provides identity verification for cloud consumers and tasks, as well as protection for data and other resources. User portal 536 provides access to the cloud computing environment 100 for consumers and system administrators. Service level management 538, which includes containers, provides cloud computing resource allocation and management such that required service levels are met. Service Level Agreement (SLA) planning and fulfillment 540 provide pre-arrangement for, and procurement of, cloud computing resources for which a future requirement is anticipated in accordance with an SLA.

Workloads layer 542 provides examples of functionality for which the cloud computing environment 100 may be utilized. Examples of workloads, tasks and functions which may be provided from this layer include: mapping and navigation 544; software development and lifecycle management 546; virtual classroom education delivery 548; data analytics processing 550; transaction processing 552; etc. More specifically, this layer includes the workloads, tasks and functions for providing an in-context cognitive information assistant 554 as described above.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

Conclusion

This concludes the description of the various embodiments of the present invention. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Since many embodiments of the invention can be made without departing from the spirit and scope of the invention, the invention resides in the claims hereinafter appended.

What is claimed is:

1. A computer-implemented system comprising:
one or more computers programmed for providing an in-context cognitive information assistant by:
obtaining a calendar entry for a user and invitees;
supplementing the calendar entry by obtaining conversations between the user and the invitees, the conversations comprising emails, chats, texts, and instant messages related to the calendar entry;
extracting cognitive data for the calendar entry and the conversations, the cognitive data comprising entities, topics, and concepts;
finding relevant materials related to both the calendar entry and the conversations in a corpus using the entities, the topics, and the concepts of the cognitive data; and
providing the relevant materials to the user in advance of the calendar entry and future conversations with the invitees.

2. The computer-implemented system of claim 1, further comprising:
displaying the relevant materials to the user in a single interface irrespective of their actual storage location.

3. The computer-implemented system of claim 1, further comprising:
further supplementing the calendar entry by obtaining other available information posted by the invitees.

4. The computer-implemented system of claim 1, wherein extracting the cognitive data comprises:
sending text of the calendar entry and the conversations to one or more cognitive services to obtain the cognitive data comprising the entities, the topics and the concepts related to the calendar entry and the conversations.

5. The computer-implemented system of claim 4, further comprising:
a priming step of indexing the cognitive data in the corpus, wherein:
content is sent to the cognitive services to extract the cognitive data; and
the cognitive data is stored in the corpus with reference to the content.

6. The computer-implemented system of claim 5, further comprising:
prioritizing the cognitive data based on a source for the content, the content's author, and the author's relationship with the user, the invitees, or both.

7. The computer-implemented system of claim 1, further comprising:
using confidence values and frequency values of each of the entity, the topic, and the concept, wherein entities, topics, and concepts with a higher frequency value are more relevant than entities, topics, and concepts with a lower frequency value, wherein the frequency value is a measurement of how frequently the entities, the topics, and the concepts are found in conversations between the user and the invitees.

8. A computer-implemented method comprising:
obtaining a calendar entry for a user and invitees;
supplementing the calendar entry by obtaining conversations between the user and the invitees, the conversations comprising emails, chats, texts, and instant messages related to the calendar entry;
extracting cognitive data for the calendar entry and the conversations;
finding relevant materials related to both the calendar entry and the conversations in a corpus using the cognitive data; and
providing the relevant materials to the user in advance of the calendar entry and future conversations with the invitees.

9. The method of claim 8, further comprising:
displaying the relevant materials to the user in a single interface irrespective of their actual storage location.

10. The method of claim 8, further comprising:
further supplementing the calendar entry by obtaining other available information posted by the invitees.

11. The method of claim 8, wherein extracting the cognitive data comprises:
sending text of the calendar entry and the conversations to one or more cognitive services to obtain the cognitive data comprising the entities, the topics and the concepts related to the calendar entry and the conversations.

12. The method of claim 11, further comprising:
a priming step of indexing the cognitive data in the corpus, wherein:
content is sent to the cognitive services to extract the cognitive data; and
the cognitive data is stored in the corpus with reference to the content.

13. The method of claim 12, further comprising:
prioritizing the cognitive data based on a source for the content, the content's author, and the author's relationship with the user, the invitees, or both.

14. The computer program product of claim 8, further comprising:
using confidence values and frequency values of each of the entity, the topic, and the concept, wherein entities, topics, and concepts with a higher frequency value are more relevant than entities, topics, and concepts with a lower frequency value, wherein the frequency value is a measurement of how frequently the entities, the topics, and the concepts are found in conversations between the user and the invitees.

15. A computer program product comprising a computer readable storage medium having program instructions embodied therewith, the program instructions executable by one or more computers to cause the one or more computers to perform a method, comprising:
providing an in-context cognitive information assistant for one or more computers programmed by:
obtaining a calendar entry for a user and invitees;
supplementing the calendar entry by obtaining conversations between the user and the invitees, the conversations comprising emails, chats, texts, and instant messages related to the calendar entry;
sending text of the calendar entry and text of the conversations to one or more cognitive services to obtain cognitive data comprising entities, topics and concepts related to the calendar entry and the conversations;
extracting the cognitive data for the calendar entry and the conversations;
finding relevant materials related to both the calendar entry and the conversations in a corpus using the entities, the topics, and the concepts of the cognitive data;
providing the relevant materials to the user in advance of the calendar entry and future conversations with the invitees; and
filtering the relevant materials based on whether or not they had been previously viewed by the user.

16. The computer program product of claim 15, further comprising:
displaying the relevant materials to the user in a single interface irrespective of their actual storage location.

17. The computer program product of claim 15, further comprising:
further supplementing the calendar entry by obtaining other available information posted by the invitees.

18. The computer program product of claim 15, comprising:
controlling access to the relevant materials provided to the user by marking content as private, organizationally public, public, in the corpus, wherein access to content marked private or organizationally public is controlled using a list of users, groups or communities and their respective access privileges.

19. The computer program product of claim 18, further comprising:
a priming step of indexing the cognitive data in the corpus, wherein:
content is sent to the cognitive services to extract the cognitive data;
the cognitive data is stored in the corpus with reference to the content; and
prioritizing the cognitive data based on a source for the content, the content's author, and the author's relationship with the user, the invitees, or both.

20. The computer program product of claim 15, further comprising:
using confidence values and frequency values of each of the entity, the topic, and the concept, wherein entities, topics, and concepts with a higher frequency value are more relevant than entities, topics, and concepts with a lower frequency value, wherein the frequency value is a measurement of how frequently the entities, the topics, and the concepts are found in conversations between the user and the invitees.

\* \* \* \* \*